US012517458B2

(12) United States Patent
Hasegawa

(10) Patent No.: US 12,517,458 B2
(45) Date of Patent: Jan. 6, 2026

(54) IMAGE FORMING APPARATUS FOR DETERMINING PERMISSION TO PERFORM REPLACEMENT WORK OF FIXING DEVICE

(71) Applicant: SHARP KABUSHIKI KAISHA, Sakai (JP)

(72) Inventor: Naoki Hasegawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/749,552

(22) Filed: Jun. 20, 2024

(65) Prior Publication Data

US 2024/0427272 A1 Dec. 26, 2024

(30) Foreign Application Priority Data

Jun. 22, 2023 (JP) ................................ 2023-102270

(51) Int. Cl.
*G03G 15/00* (2006.01)
*G03G 21/16* (2006.01)

(52) U.S. Cl.
CPC ..... *G03G 21/1685* (2013.01); *G03G 15/5016* (2013.01); *G03G 15/5091* (2013.01); *G03G 2215/00734* (2013.01); *G03G 2221/1639* (2013.01)

(58) Field of Classification Search
CPC ............. G03G 15/502; G03G 15/5091; G03G 15/5016; G03G 21/1685; G03G 2221/1639; G06F 3/1239; G06F 3/1296
See application file for complete search history.

(56) References Cited

U.S. PATENT DOCUMENTS

2003/0180058 A1* 9/2003 Alegria .................... B41J 29/54 399/24
2004/0101321 A1* 5/2004 Alegria .............. G03G 15/5016 399/80
2007/0058990 A1* 3/2007 Weaver ................ G03G 15/502 399/9
2009/0103937 A1* 4/2009 Kudo ................... G03G 15/502 399/80
2013/0136459 A1* 5/2013 Hirama ................ G03G 15/556 399/80

(Continued)

FOREIGN PATENT DOCUMENTS

JP 2017-003725 A 1/2017

*Primary Examiner* — Robert B Beatty
(74) *Attorney, Agent, or Firm* — ScienBiziP, P.C.

(57) ABSTRACT

An image forming apparatus that includes an apparatus main body, a controller, a storage, and a sheet feeding tray is provided. A fixing device that thermally fixes a toner image on a sheet is detachably mounted on the apparatus main body. The controller performs authentication of a user using the image forming apparatus. The storage stores user information indicating of a permission to perform replacement work of the fixing device by the user. The controller further determines whether the replacement work of the fixing device is permitted when a width of the sheet is changed, inquires the user whether to perform the replacement of the fixing device based on one or more determination results, and determines the permission based on the user information at a time of usage by the authenticated user.

3 Claims, 12 Drawing Sheets

(56) References Cited

U.S. PATENT DOCUMENTS

| | | | | |
|---|---|---|---|---|
| 2015/0212468 | A1* | 7/2015 | Adachi | G03G 15/5091 399/80 |
| 2020/0050141 | A1* | 2/2020 | Murota | G03G 15/70 |
| 2024/0412023 | A1* | 12/2024 | Chiba | G03G 15/55 |

* cited by examiner

FIG. 4

401

| USER ID | PERMISSION TO PERFORM REPLACEMENT WORK |
|---|---|
| user1 | AVAILABLE |
| user2 | NOT AVAILABLE |
| ... | ... |

IMAGE FORMING APPARATUS FOR DETERMINING PERMISSION TO PERFORM REPLACEMENT WORK OF FIXING DEVICE

CROSS-REFERENCE TO RELATED APPLICATION

The present application claims priority from Japanese Application JP2023-102270, the content to which is hereby incorporated by reference into this application.

BACKGROUND OF THE INVENTION

1. Field of the Invention

The present disclosure relates to an image forming apparatus.

2. Description of the Related Art

In an image forming apparatus, there is known a technique of notifying an operator of information as to whether a temperature of a fixing device is lowered to a predetermined temperature or lower, when the fixing device is replaced by another fixing device.

SUMMARY OF THE INVENTION

When a sheet having the same width continuously passes through a fixing belt, a flaw occurs in a portion of the fixing belt with which an end portion of the sheet comes into contact, and when a sheet having a larger width passes through the fixing belt, a streak due to the flaw occurs on the sheet. In order to avoid this, a method in which a fixing belt is selectively used according to a sheet width by replacing a fixing device including the fixing belt is considered.

In a conventional image forming apparatus, there is a problem that a general user may be confused because even the general user who does not know a method of replacing a fixing device is allowed to proceed with replacement work.

An object of an aspect of the present disclosure is to prevent a user who cannot perform replacement work of a fixing device from being confused.

An image forming apparatus according to an aspect of the present disclosure is an image forming apparatus includes: an apparatus main body to which a fixing device that thermally fixes a toner image on a sheet is detachably mounted; a controller that performs authentication of a user using the image forming apparatus, and controls the image forming apparatus; and a storage that stores user information indicating permission to perform replacement work of the fixing device by the user. The controller determines the permission to perform the replacement work of the fixing device by the user, based on the user information at a time of usage by the authenticated user, and inquires the user whether to perform replacement of the fixing device according to a determination result.

BRIEF DESCRIPTION OF THE DRAWINGS

FIG. 4 is an example of a user account table.

DETAILED DESCRIPTION OF THE INVENTION

Figure 1:
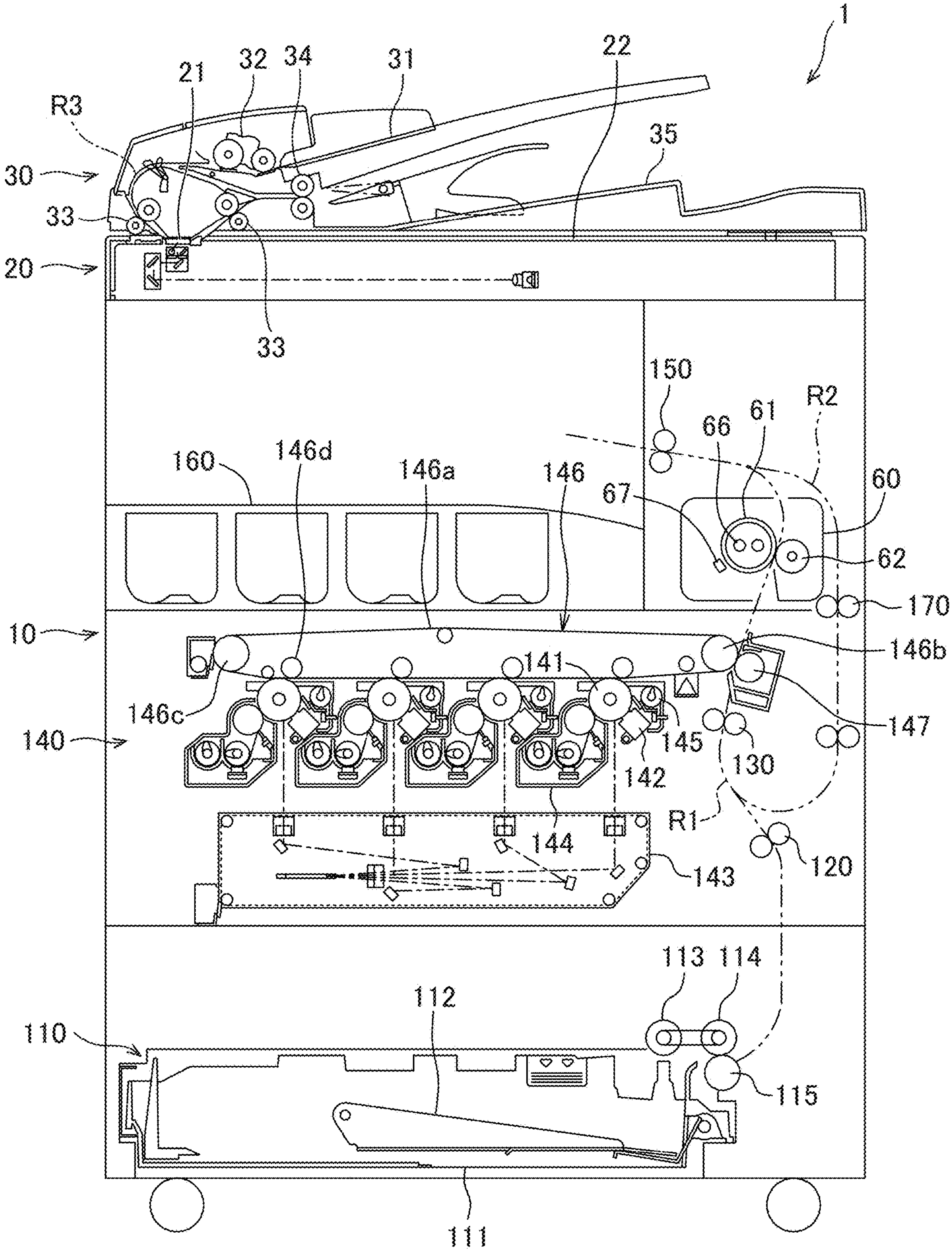
FIG. 1 is a schematic cross-sectional view illustrating an image forming apparatus.

In the following, an embodiment is described with reference to the drawings. Note that, in the drawings, the same or equivalent element is denoted by the same reference sign, and overlapping description thereof is omitted.

In the following, an image forming apparatus 1 according to the embodiment is described with reference to FIG. 1. FIG. 1 is a schematic cross-sectional view illustrating the image forming apparatus 1. The image forming apparatus 1 is, for example, a multifunction peripheral having a copy function, a printer function, a scanner function, a facsimile function, and the like.

Figure 3:
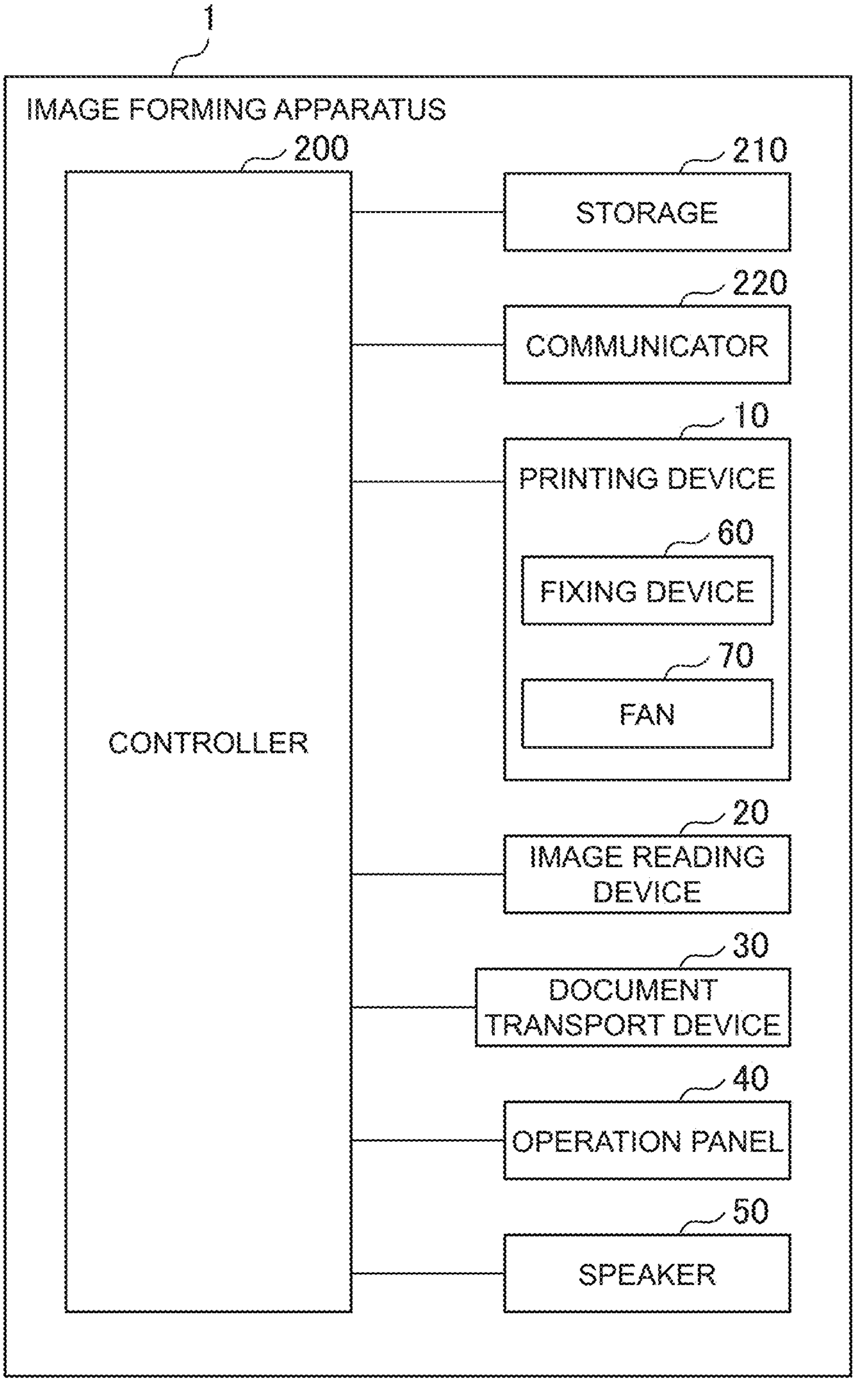
FIG. 3 is a block diagram illustrating a hardware configuration of the image forming apparatus.

The image forming apparatus 1 includes a printing device 10, an image reading device 20, a document transport device 30, an operation panel 40 (see FIG. 3), and a speaker 50 (see FIG. 3). The image forming apparatus 1 transmits image data read by the image reading device 20 to the outside, and forms an image on a sheet, based on image data of a read document or image data received from the outside in a single color or multiple colors.

The printing device 10 includes a sheet feeder 110, a transport roller pair 120, a registration roller pair 130, an image former 140, a discharge roller pair 150, and a discharge tray 160. Inside the printing device 10, a transport path R1 for feeding a sheet fed from the sheet feeder 110 to the discharge tray 160 via the transport roller pair 120, the registration roller pair 130, the image former 140, and the discharge roller pair 150 is formed.

The sheet feeder 110 is disposed at a lower portion of the image former 140, and includes a sheet feeding tray 111 that accommodates sheets, an internal tray 112 on which sheets are loaded, a pick-up roller 113 that is provided on an upper side at one end of the internal tray 112, a sheet feeding roller 114 that is disposed on a downstream side of the pick-up roller 113 in a sheet transport direction, and a separation roller 115 that is pressed against the sheet feeding roller 114. Further, the sheet feeder 110 may be plural.

In the sheet feeder 110, a sheet is delivered from the internal tray 112 by the pick-up roller 113, and guided to the sheet feeding roller 114, separated one by one while passing between the sheet feeding roller 114 and the separation roller 115, and transported to the transport path R1 by the transport roller pair 120.

The registration roller pair 130 feeds a sheet in synchronism with a timing of toner image formation. The registration roller pair 130 temporarily stops the sheet, aligns a leading end of the sheet, and then transports the sheet in accordance with a transfer timing of a toner image in a nip area between an intermediate transfer belt 146*a* (fixing belt) to be described later, and a transfer roller 147.

The image former 140 includes a photosensitive drum 141, a charger 142, an exposure unit 143, a developing unit 144, a cleaner unit 145, an intermediate transfer belt unit 146, the transfer roller 147, a fixing device (fixing unit) 60, and the like.

Note that, image data to be handled in the image former 140 are associated with a color image of four colors of black (K), cyan (C), magenta (M), and yellow (Y). For this reason, each of the photosensitive drum 141, the charger 142, the developing unit 144, and the cleaner unit 145 is provided by four in such a way as to form four types of latent images according to each color. Thus, four image forming stations are constituted by these components. A toner cartridge is provided by four in such a way as to be able to supply toner associated with each image forming station.

The photosensitive drum 141 is an electrostatic latent image carrier in which a photosensitive layer is formed on a surface of a cylindrical base member having conductivity. The charger 142 charges the surface of the photosensitive drum 141 to a predetermined potential. The exposure unit 143 is a laser scanning unit including a laser emitter, a reflecting mirror, and the like. The exposure unit 143 forms an electrostatic latent image according to image data on the surface of the photosensitive drum 141 by exposing the charged surface of the photosensitive drum 141 with light. The developing unit 144 visualizes the electrostatic latent image, which is formed on the surface of the photosensitive drum 141, with toner of four colors. The cleaner unit 145 removes and collects residual toner on the surface of the photosensitive drum 141 after development and image transfer.

The intermediate transfer belt unit 146 includes the intermediate transfer belt 146*a*, a drive roller 146*b*, a driven roller 146*c*, four intermediate transfer rollers 146*d*, and the like. The intermediate transfer belt unit 146 is disposed above the photosensitive drum 141. The intermediate transfer belt 146*a* is provided in such a way as to contact each of the photosensitive drums 141. A toner image is formed on the intermediate transfer belt 146*a* by sequentially superimposing and transferring a toner image of each color formed on the associated photosensitive drum 141 onto the intermediate transfer belt 146*a* by using each of the intermediate transfer rollers 146*d*.

The transfer roller 147 is disposed in the vicinity of the drive roller 146*b* in the transport path R1. By allowing a sheet to pass through the nip area between the transfer roller 147 and the intermediate transfer belt 146*a*, a toner image, which is formed on the intermediate transfer belt 146*a*, is transferred onto the sheet.

The fixing device 60 thermally fixes a toner image to a sheet. The fixing device 60 is detachably provided to the printing device 10 (apparatus main body). The fixing device 60 is disposed above the transfer roller 147, in other words, on the downstream side in a sheet transport direction in the transport path R1. When a sheet passes through the fixing device 60, a toner image is thermally fixed on the sheet. The sheet on which the toner image is fixed is transported to the discharge tray 160 by the discharge roller pair 150. A specific configuration of the fixing device 60 is described later.

Further, when image formation is performed not only on a front surface of a sheet but also on a back surface thereof, the sheet is transported from the discharge roller pair 150 to a reverse path R2 in the opposite direction. In the reverse path R2, the front and the back of the sheet is inverted through a reverse roller pair 170, and the sheet is guided again to the registration roller pair 130. Thereafter, the sheet in which image formation is performed on the back surface in the same manner as the front surface is transported to the discharge tray 160.

The image reading device 20 reads an image formed on a sheet, and generates image data. A transparent plate-like feed-reading contact glass 21 is provided on the upper surface on the left side of the image reading device 20. A transparent plate-like placement-reading contact glass 22 is provided on the upper surface of the image reading device 20 and on the right side of the feed-reading contact glass 21. The document transport device 30 is mounted to be openable and closable above the image reading device 20 via a hinge or the like. When the document transport device 30 is opened via a hinge or the like, the upper surface of the image reading device 20 is opened, and a document can be manually placed on the placement-reading contact glass 22. The operation panel 40 (see FIG. 3) is provided on a front side with respect to the upper surface of the image reading device 20. The operation panel 40 displays various pieces of information, and receives input from a user. The operation panel 40 is an example of a display operation acceptor, and includes a display panel, a touch panel, hard keys, and the like. The speaker 50 (see FIG. 3) is provided in the vicinity of the operation panel 40. The speaker 50 is an example of a sound output unit.

The image reading device 20 further includes a light source, a plurality of mirrors, an imaging lens, a line sensor, and the like. The image reading device 20 exposes a surface of a sheet with light from a light source, and guides reflected light reflected from the sheet surface to the imaging lens by the plurality of mirrors. Then, the reflected light is formed on a light receiving element of the line sensor by the imaging lens. The line sensor detects brightness or chromaticity of the reflected light formed on the light receiving element, and generates image data based on an image on the sheet surface. As the line sensor, a CCD, a CIS, and the like are used.

The document transport device 30 includes a sheet feeding tray 31, a sheet feeding unit 32, a transport roller pair 33, a discharge roller pair 34, and a discharge tray 35. Inside the document transport device 30, a transport path R3 for feeding a sheet fed from the sheet feeding unit 32 to the discharge tray 35 via the transport roller pair 33, the image reading device 20, and the discharge roller pair 34 is formed.

The sheet feeding tray 31 is a tray on which a plurality of documents can be stacked and placed. The sheet feeding tray 31 is movable up and down by an elevation mechanism (not illustrated). The discharge tray 35 is a tray on which a plurality of documents can be stacked and placed. The sheet feeding unit 32 transports a sheet on the sheet feeding tray 31 toward the transport path R3. The transport roller pair 33 transports the sheet on the transport path R3 toward the image reading device 20. The discharge roller pair 34 transports the sheet on the transport path R3 toward the discharge tray 35.

Figure 2:
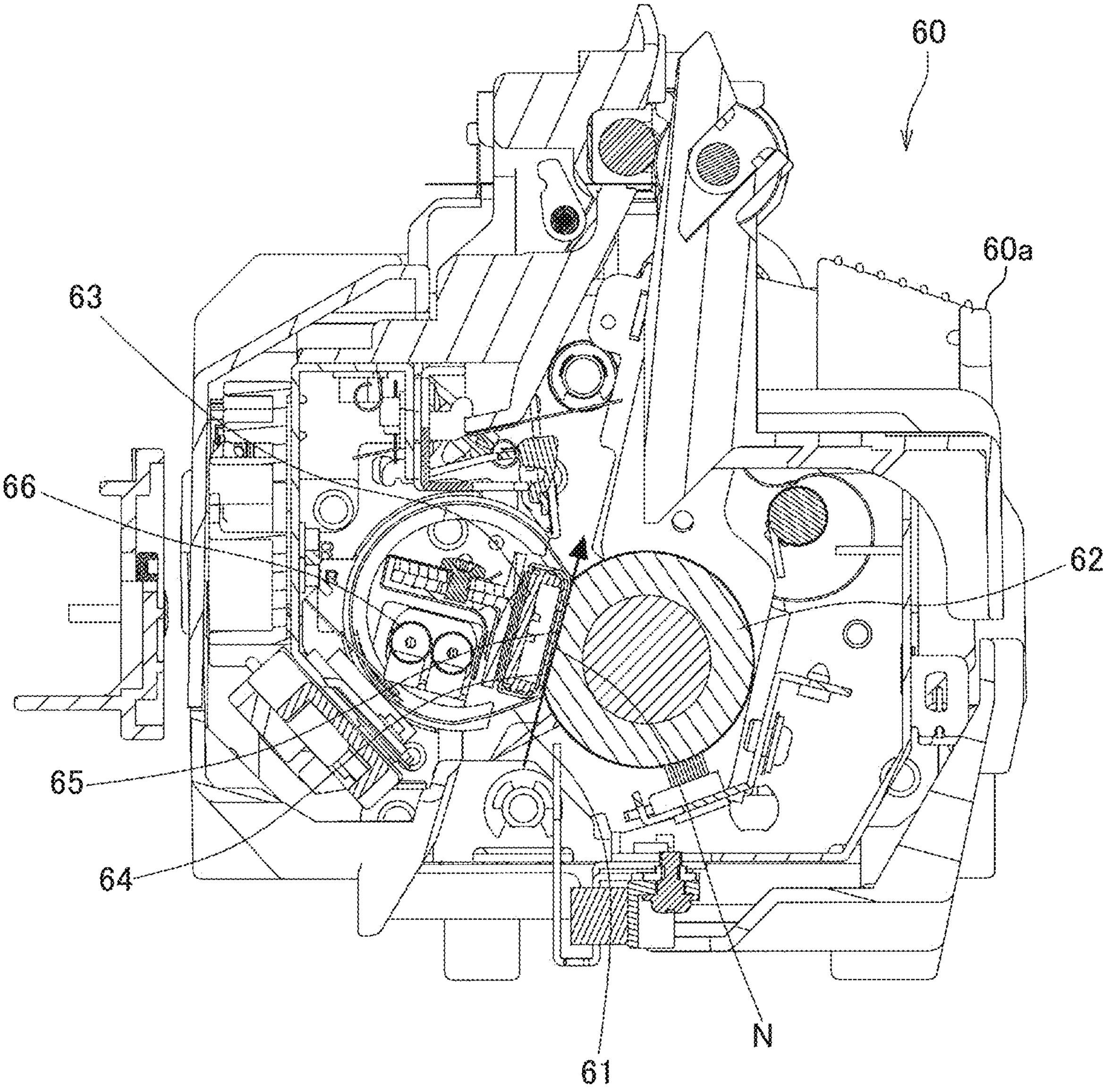
FIG. 2 is a cross-sectional view illustrating a fixing device.

A specific configuration of the fixing device 60 is described by using FIG. 2. FIG. 2 is a cross-sectional view of the fixing device 60.

The fixing device 60 mainly includes a fixing belt (heating rotating member) 61, and a pressure roller (pressure rotating member) 62. The fixing device 60 transports a sheet in a direction of the arrow illustrated in FIG. 2 in a nip area N to be formed by the fixing belt 61 and the pressure roller 62.

Inside the fixing belt 61, a fixing pad 63, a pad heat transfer plate 64 provided on the fixing pad 63, a sliding sheet (sliding member) 65 provided between the pad heat transfer plate 64 and the fixing belt 61, a heater lamp 66 serving as a heat source, and the like are provided.

The fixing device 60 includes a housing 60*a* that accommodates various constituent components. Inside the housing 60*a*, the fixing belt 61, the pressure roller 62, a temperature sensor 67 (see FIG. 1) for detecting a peripheral temperature of the fixing belt 61, and the like are provided. The temperature sensor 67 is, for example, a thermistor. The fixing belt 61 is heated to a predetermined fixing temperature (for example, 170° C.) by the heater lamp 66. Further, the pressure roller 62 is provided in such a way as to press the fixing belt 61 against the fixing pad 63. When a sheet passes through the nip area N between the pressure roller 62 and the fixing belt 61, a toner image transferred to the sheet is melted, mixed, and pressed, and the toner image is thermally fixed to the sheet.

A fan 70 (refer to FIG. 3) for cooling the fixing device 60 is provided in the vicinity of the fixing device 60 within the printing device 10. The fan 70 sucks air around the fixing device 60, and discharges the air to the outside of the printing device 10 (apparatus main body).

Note that, the fan 70 is preferably provided in the vicinity of the fixing device 60 of the printing device 10, but the embodiment is not limited thereto. The fan 70 may be provided at any appropriate position inside the printing device 10, as long as the fixing device 60 can be cooled by circulating the air inside the printing device 10.

A hardware configuration of the image forming apparatus 1 is described by using FIG. 3. FIG. 3 is a block diagram illustrating a hardware configuration of the image forming apparatus 1.

The image forming apparatus 1 includes the printing device 10 including a controller 200, a storage 210, a communicator 220, the fixing device 60, and the fan 70; the image reading device 20; the document transport device 30; the operation panel 40; the speaker 50; and the like.

The controller 200 controls the image forming apparatus 1. The controller 200 achieves various functions by reading and executing various programs stored in the storage 210. The controller 200 is configured of, for example, one or more central processing units (CPUs), and the like.

The storage 210 stores various programs necessary for an operation of the image forming apparatus 1, and various pieces of data. The storage 210 is configured, for example, of a storage device, such as a solid state drive (SSD) being a semiconductor memory, or a hard disk drive (HDD). The storage 210 stores password information for use in user authentication. In the password information, a user ID and a password are stored in association with each other. The storage 210 stores a user account table (user information) indicating permission to perform replacement work of the fixing device 60 by the user. Details on the user account table are described later.

The communicator 220 controls, for example, wireless communication of various pieces of data with an external terminal such as a computer. Note that, the communicator 220 is not limited to the one that controls wireless communication, and may be the one that controls wired communication.

The controller 200 is connected to the printing device 10 including the storage 210, the communicator 220, the fixing device 60, and the fan 70; the image reading device 20; the document transport device 30; the operation panel 40; the speaker 50; and the like.

The controller 200 can form an image on a sheet, based on image data read by the image reading device 20 or image data received through the communicator 220 in a single color or multiple colors by controlling the printing device 10. Further, the controller 200 can read image data on a document by controlling the image reading device 20 and the document transport device 30.

The controller 200 performs authentication of a user using the image forming apparatus 1. The controller 200 determines whether replacement work of the fixing device 60 by the user is permitted, based on user information when the authenticated user uses the image forming apparatus 1, and inquires the user whether to perform replacement of the fixing device 60 according to a determination result.

The controller 200 displays a different message on the operation panel 40 between a case, where it is determined that replacement work of the fixing device 60 by the user is permitted, and a case, where the replacement work of the fixing device 60 by the user is not available.

When it is determined that replacement of the fixing device 60 by the user is permitted, the controller 200 displays, on the operation panel 40, a message inquiring the user whether to perform the replacement of the fixing device 60. When it is determined that the replacement work of the fixing device 60 by the user is not permitted, the controller 200 displays, on the operation panel 40, a message of prompting to contact a user capable of performing replacement work of the fixing device 60.

The controller 200 determines whether the width of a sheet accommodated in the sheet feeding tray 111 is changed, and when it is determined that the width of the sheet accommodated in the sheet feeding tray 111 is changed, the controller 200 determines whether replacement work of the fixing device 60 by the user is permitted, and inquires the user whether to perform replacement of the fixing device 60 according to a determination result.

FIG. 4 is an example of the user account table.

A user account table 401 is written in such a way that a user ID and permission to perform replacement work are associated with each other. The user ID is information for identifying a user. The permission to perform replacement work is information indicating whether the user can replace the fixing device 60. "Permitted" indicates that the fixing device 60 can be replaced, and "not permitted" indicates that the fixing device 60 cannot be replaced.

For example, in the user account table 401 in FIG. 4, a user whose user ID is user 1 indicates that the user can replace the fixing device 60. Further, a user whose user ID is user 2 indicates that the user cannot replace the fixing device 60. The user account table 401 is an example of user information. The user account table 401 is set, for example, by an administrator or the like of the image forming apparatus 1.

Next, inquiry processing of the fixing device 60 at a login time is described.

Figure 5:
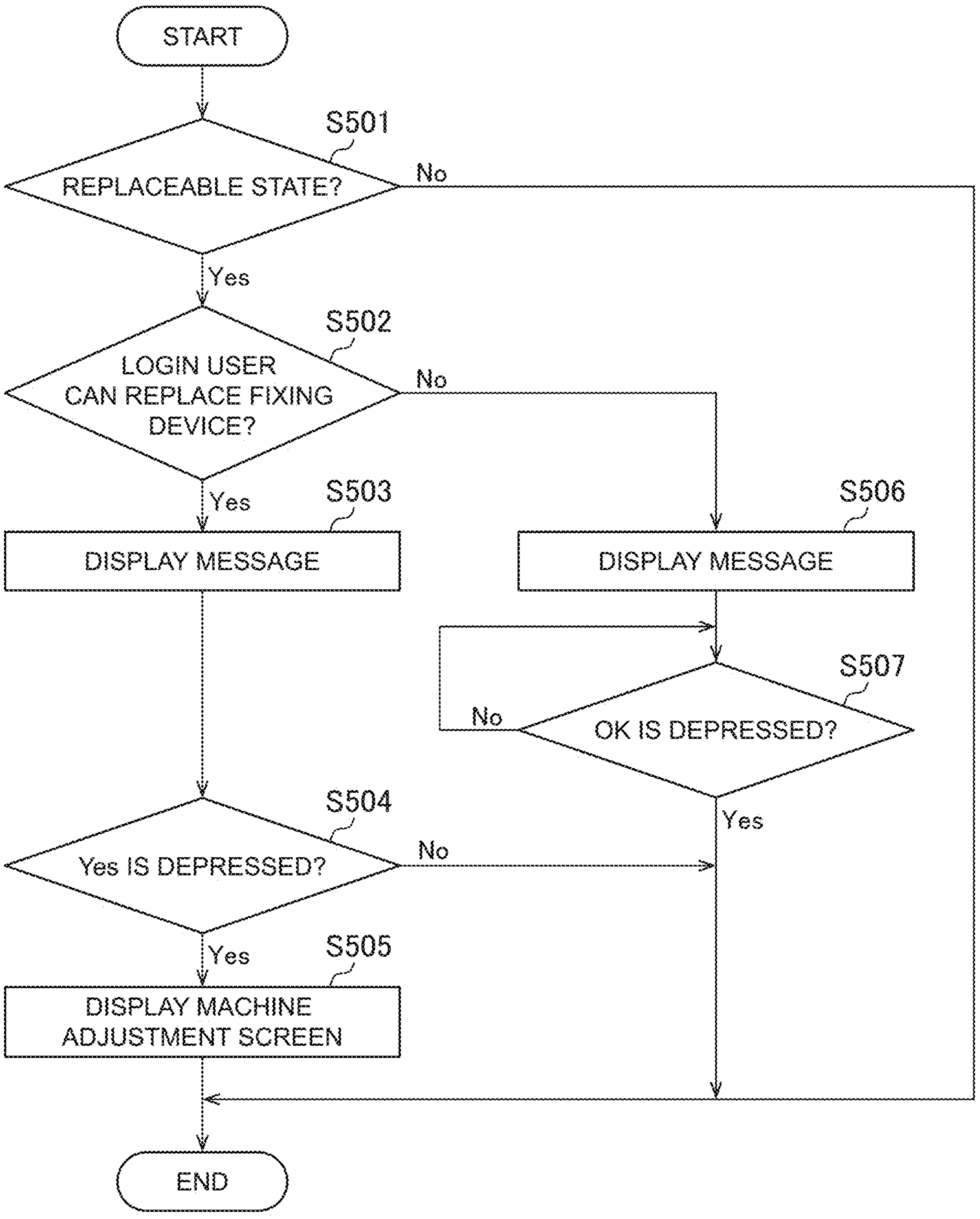
FIG. 5 is a flowchart of replacement inquiry processing of the fixing device at a login time.

FIG. 5 is a flowchart of replacement inquiry processing of the fixing device at a login time.

Figure 6:
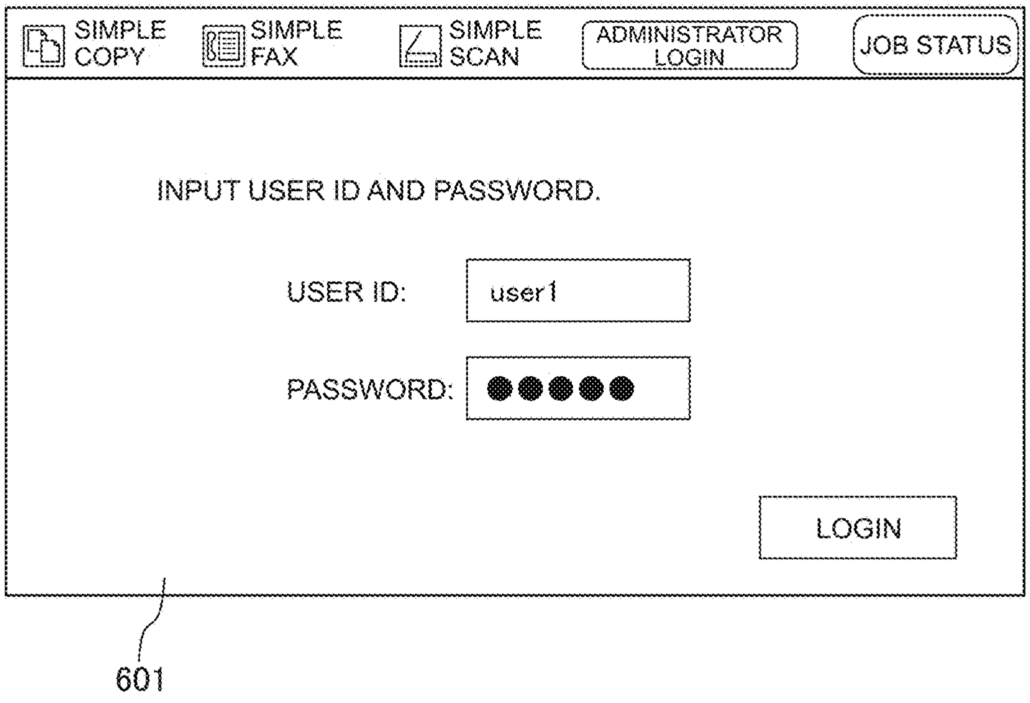
FIG. 6 is a diagram illustrating an example of a login screen.
Figure 7:
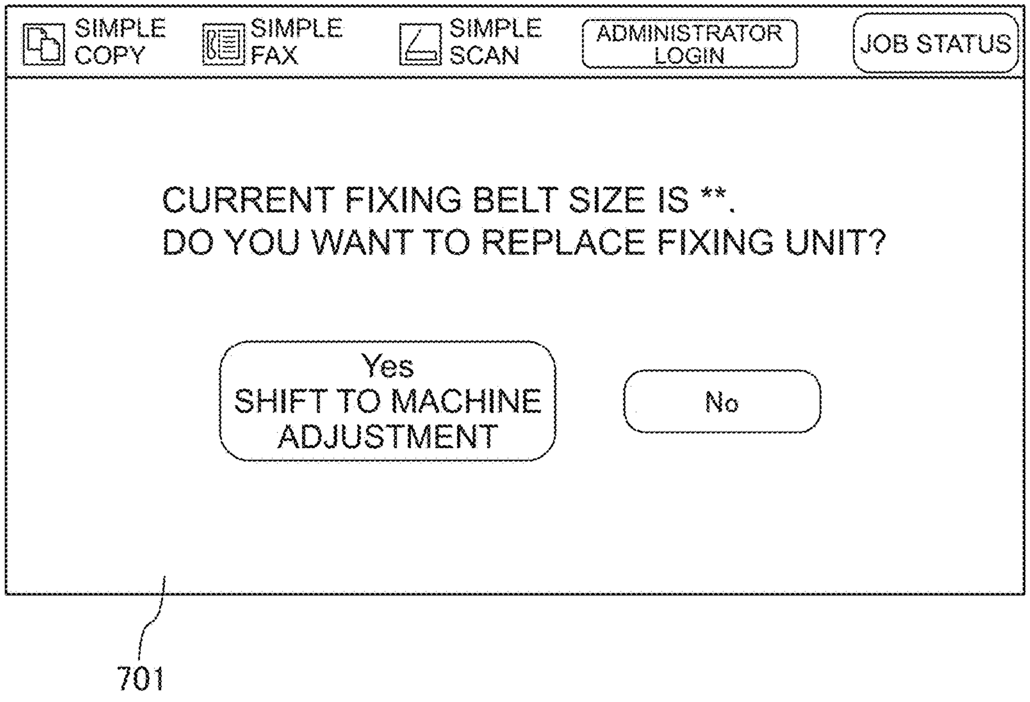
FIG. 7 is a diagram illustrating an example of a message screen.
Figure 8:
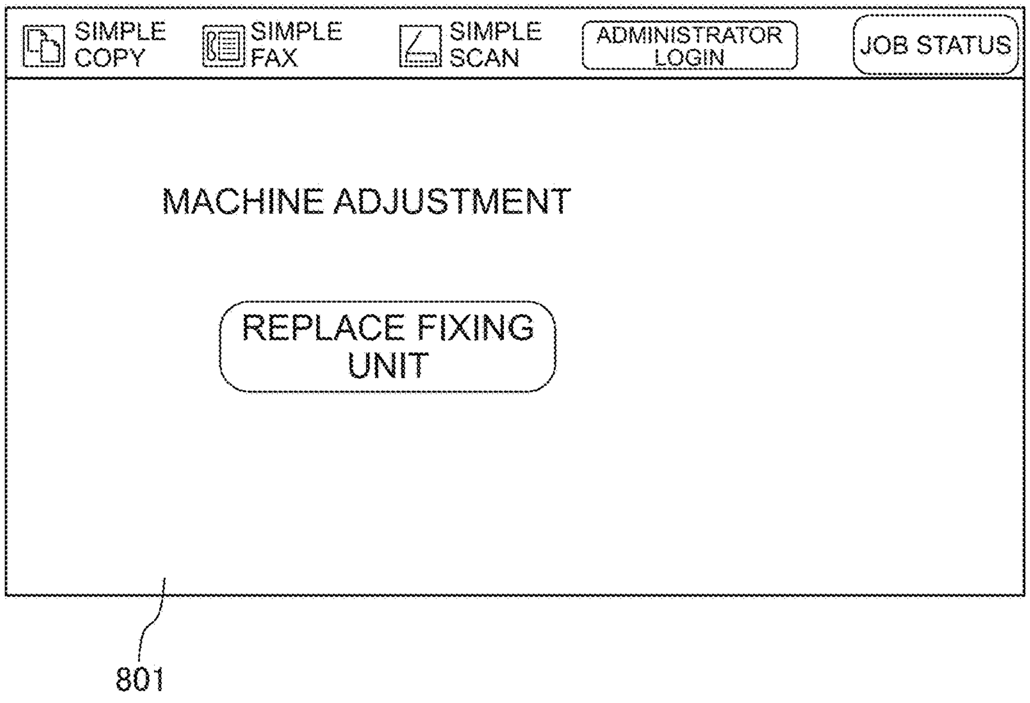
FIG. 8 is a diagram illustrating an example of a machine adjustment screen.
Figure 9:
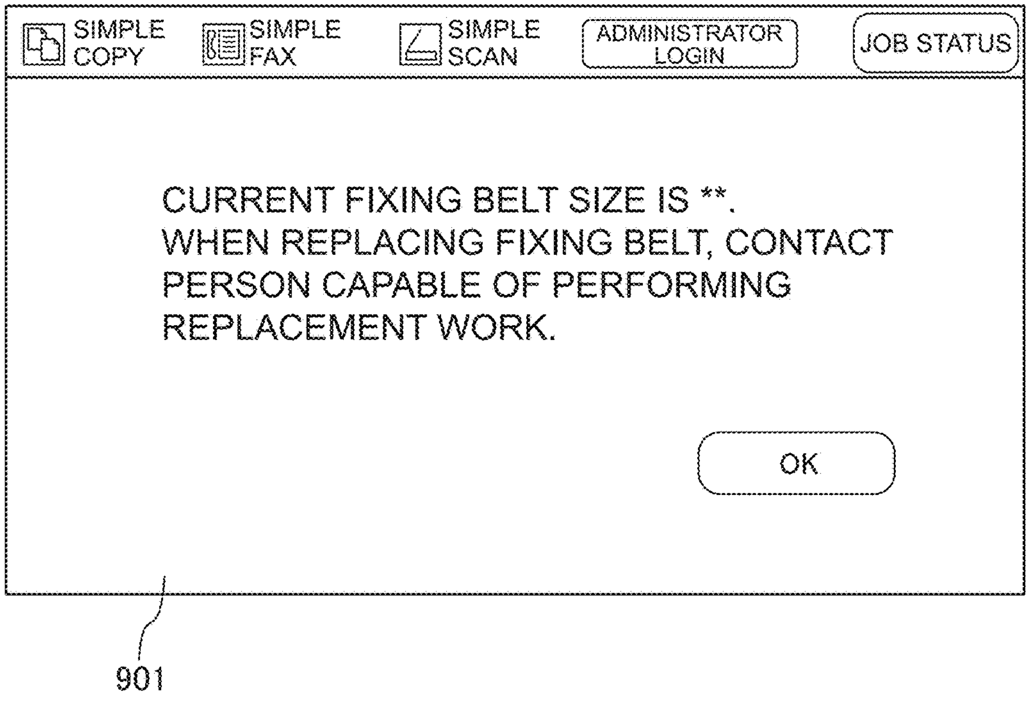
FIG. 9 is a diagram illustrating an example of a message screen.

FIG. 6 is a diagram illustrating an example of a login screen. FIGS. 7 and 9 are diagrams illustrating an example of a message screen. FIG. 8 is a diagram illustrating an example of a machine adjustment screen.

First, the controller 200 performs authentication of a user using the image forming apparatus 1, and the user logs in the image forming apparatus 1. For example, the controller 200 displays a login screen 601 as illustrated in FIG. 6 on the operation panel 40 at a time of activation of the image forming apparatus 1 or in response to depressing of an "administrator login" button displayed on the operation panel 40.

As illustrated in FIG. 6, on the login screen 601, an entry form of a user ID and a password, and a login icon are displayed together with a message "input a user ID and a password on the operation panel 40".

When the user inputs a user ID and a password, and touches the login icon, and when the controller 200 compares the input user ID and password with a user ID and a password written in password information stored in the storage 210, and the results match each other, the controller 200 authenticates that the user is a regular user. Thus, the user is in a login state in the image forming apparatus 1, and the user starts using the image forming apparatus 1.

Description is continued by referring back to FIG. 5.

In step S501, the controller 200 determines whether the fixing device 60 is in a replaceable state. For example, the controller 200 determines whether the fixing device 60 is in a replaceable state, based on a temperature of the fixing device 60. For example, when a temperature of the fixing device 60 is equal to or less than a threshold value, the controller 200 determines that the fixing device 60 is in a replaceable state, and when the temperature of the fixing device 60 is more than the threshold value, the controller 200 determines that the fixing device 60 is not in a replaceable state. When it is determined that the fixing device 60 is in a replaceable state, the control proceeds to step S502, and when it is determined that the fixing device 60 is not in a replaceable state, the replacement inquiry processing at a login time is finished.

In step S502, the controller 200 determines whether the login user can perform replacement work of the fixing device 60, based on the user account table 401. When it is determined that the login user can perform replacement work of the fixing device 60, the control proceeds to step S503, and when it is determined that the login user cannot perform replacement work of the fixing device 60 (not permitted), the control proceeds to step S506. For example, when a user whose user ID is user 1 logs in, the controller 200 determines that the login user can perform replacement work of the fixing device 60, based on the user account table 401 in FIG. 4. For example, when a user, whose user ID is user 2, logs in, the controller 200 determines that the login user cannot perform replacement work of the fixing device 60, based on the user account table 401 in FIG. 4.

In step S503, the controller 200 inquires the user whether to perform replacement of the fixing device 60. Specifically, for example, the controller 200 displays a message screen 701 as illustrated in FIG. 7 on the operation panel 40. On the message screen 701, "a current fixing belt size is . Do you want to replace the fixing unit?" is displayed as a message. Note that "" is, for example, a size of the intermediate transfer belt 146*a* loaded in the image forming apparatus 1. Further, on the message screen 701, a "Yes" button for shifting to a machine adjustment screen, and a "No" button indicating that replacement of the fixing device 60 is not performed are displayed.

In step S504, the controller 200 determines whether the "Yes" button on the message screen 701 is depressed by the user, and it is determined that the "Yes" button is depressed, the control proceeds to step S505, and when it is determined that the "Yes" button is not depressed (the "No" button is depressed), the replacement inquiry processing at a login time is finished.

In step S505, the controller 200 displays a machine adjustment screen 801 as illustrated in FIG. 8 on the operation panel 40. On the machine adjustment screen 801, a "fixing unit replacement" button indicating start of replacement processing of the fixing device 60 is displayed. When the "fixing unit replacement" button is depressed by the user, the controller 200 starts replacement processing of the fixing device 60.

In replacement processing of the fixing device 60, the controller 200 operates the fan 70 to cool the fixing device 60 to a predetermined temperature or lower. When the temperature of the fixing device 60 becomes equal to or lower than the predetermined temperature, the controller 200 displays a procedure of replacement work of the fixing device 60 on the operation panel 40. The user performs replacement of the fixing device 60 while referring to the indication on the operation panel 40. The controller 200 includes a printed sheet counter associated with each fixing device 60 for managing the life of the fixing device 60, and counts the number of printed sheets for each fixing device 60. When the fixing device 60 is replaced, the controller 200 switches the printed sheet counter for counting the number of printed sheets to a printed sheet counter associated with the replaced new fixing device 60.

In step S506, the controller 200 displays a message screen 901 as illustrated in FIG. 9 on the operation panel 40. On the message screen 901, a message of prompting to contact a user capable of performing replacement work of the fixing device 60 is displayed. Specifically, as illustrated in FIG. 9, on the message screen 901, "a current fixing belt size is . When replacing the fixing unit, contact a person capable of performing replacement work." is displayed as a message. Further, on the message screen 901**, an "OK" button to be depressed when the above message is approved is displayed.

In step S507, the controller 200 determines whether the "OK" button on the message screen 901 is depressed by the user, and when it is determined that the "OK" button is depressed, the replacement inquiry processing at a login time is finished. The controller 200 repeats determination as to whether the "OK" button is depressed until the "OK" button is depressed.

Next, inquiry processing of the fixing device 60 at a time of changing a size of a sheet within the sheet feeding tray 111 is described.

Figure 10A:
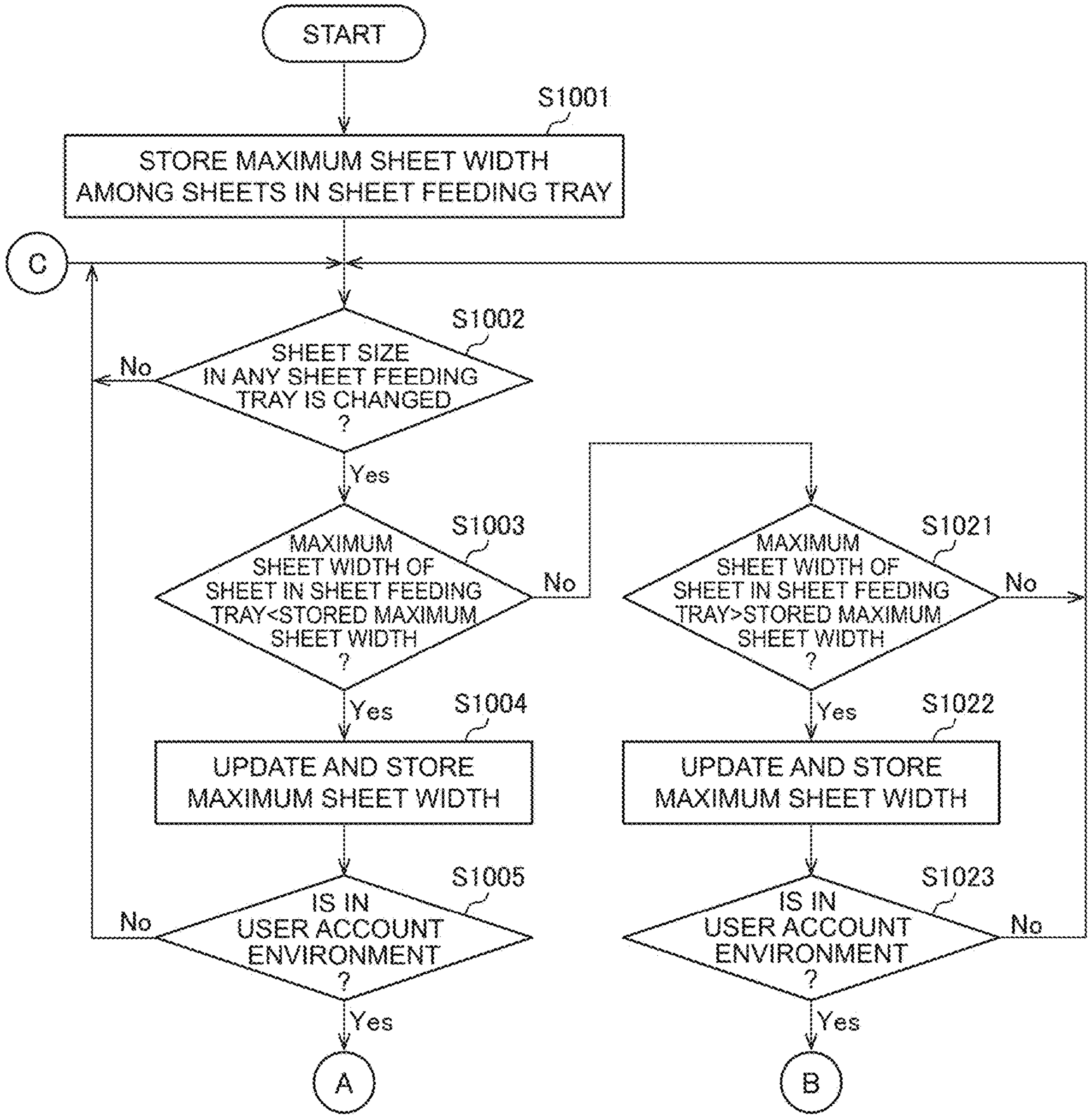
FIG. 10A is a flowchart of replacement inquiry processing of the fixing device at a time of changing a size of a sheet in a sheet feeding tray.
Figure 10B:
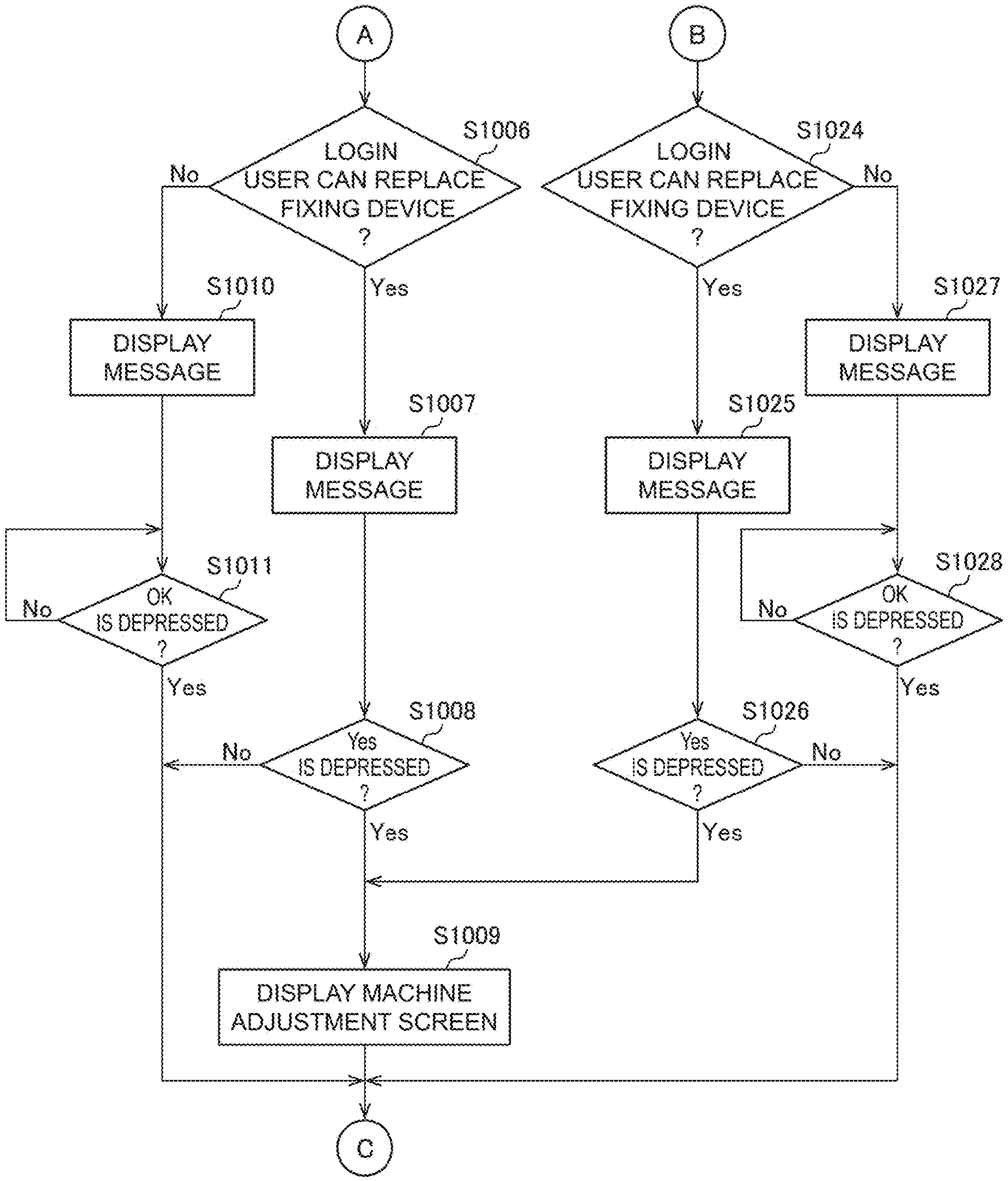
FIG. 10B is a flowchart of replacement inquiry processing of the fixing device at a time of changing a size of a sheet in the sheet feeding tray.
Figure 11:
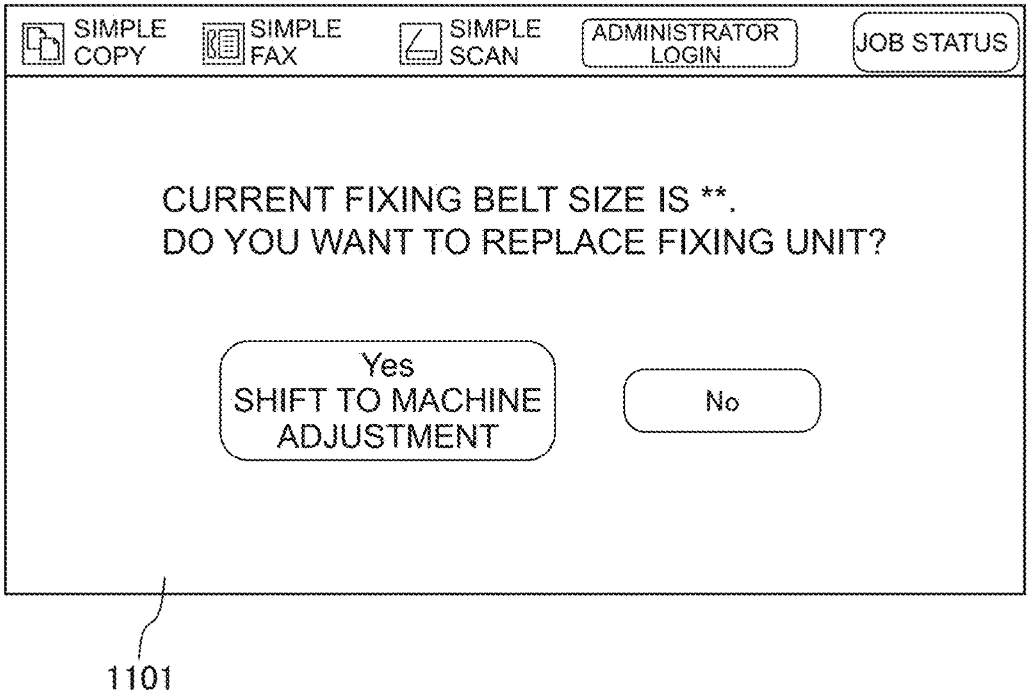
FIG. 11 is a diagram illustrating an example of a message screen.
Figure 12:
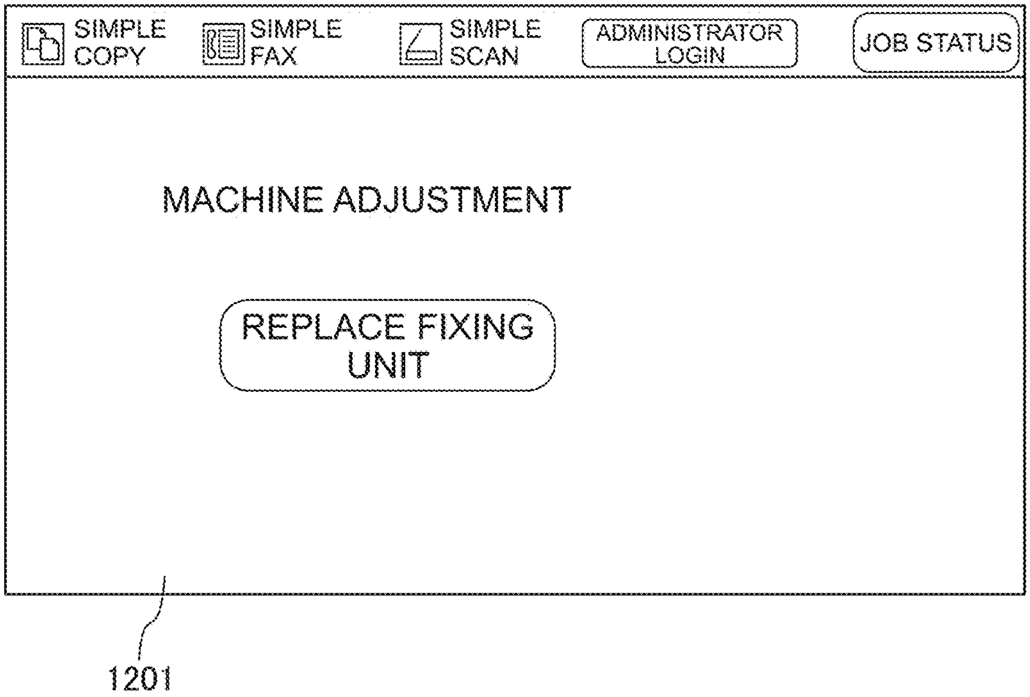
FIG. 12 is a diagram illustrating an example of a machine adjustment screen.
Figure 13:
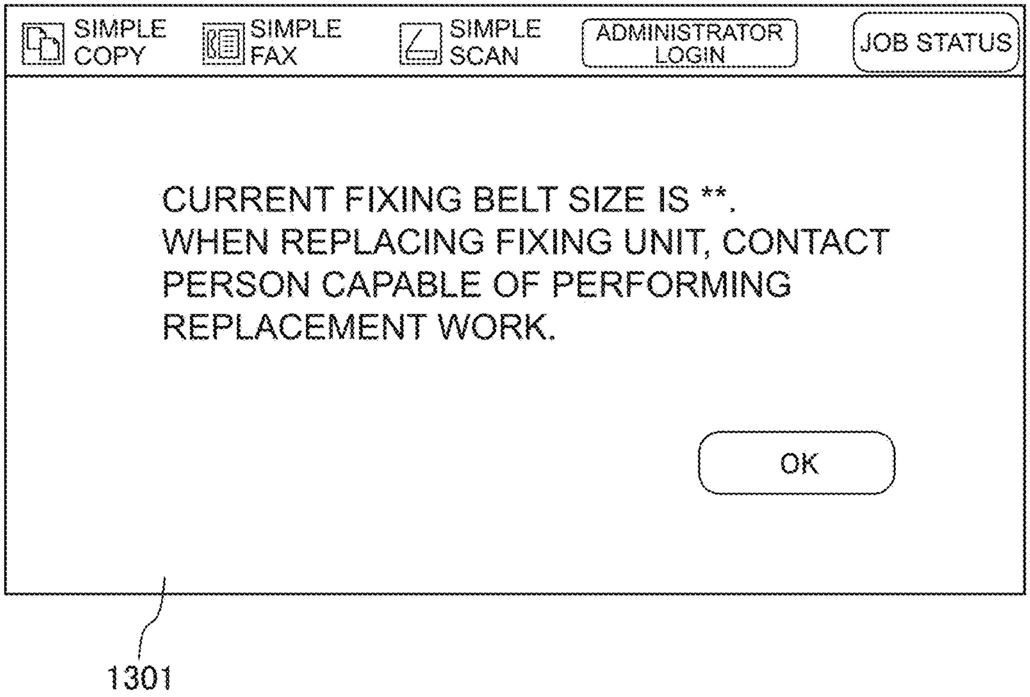
FIG. 13 is a diagram illustrating an example of a message screen.
Figure 14:
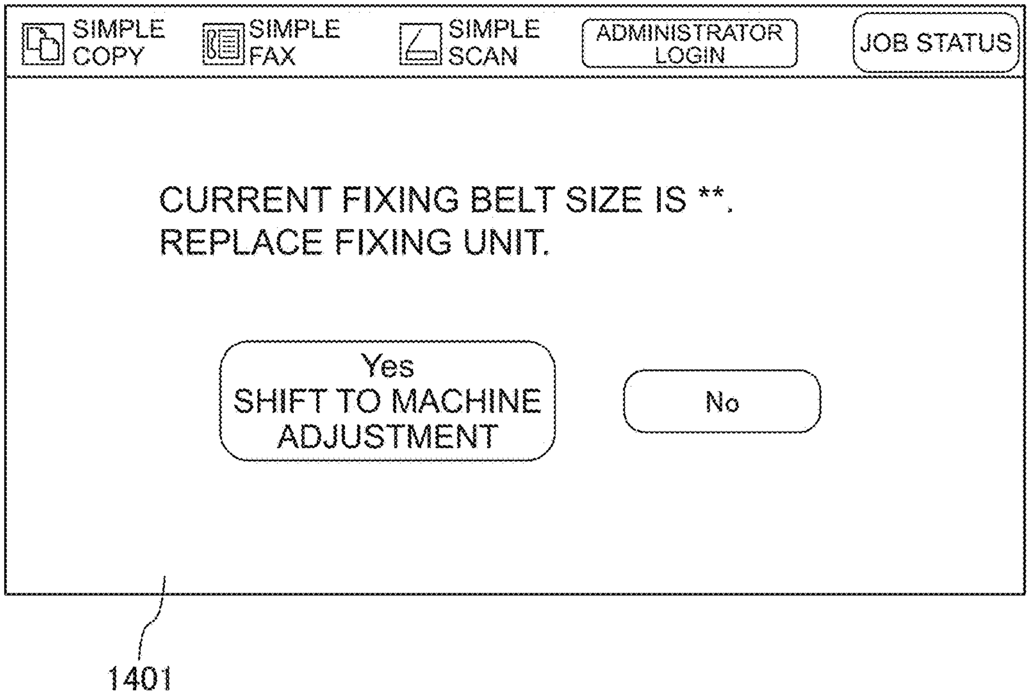
FIG. 14 is a diagram illustrating an example of a message screen.

FIGS. 10A and 10B are flowcharts of replacement inquiry processing of the fixing device at a time of changing a size of a sheet in the sheet feeding tray. FIGS. 11, and 13 to 14 are diagrams illustrating an example of a message screen. FIG. 12 is a diagram illustrating an example of a machine adjustment screen.

Herein, it is assumed that the sheet feeder 110 is plural, in other words, the sheet feeding tray 111 is plural.

In step S1001, the controller 200 stores, in the storage 210, a maximum width (maximum sheet width) of a sheet accommodated in the sheet feeding tray 111. The size (e.g., A4 or the like) of a sheet accommodated in each of the plurality of sheet feeding trays 111 is, for example, input from the operation panel 40 by a user. The controller 200 stores, in the storage 210, a size of a sheet accommodated in each of the current plurality of sheet feeding trays 111. Further, the storage 210 stores a width of a sheet of each size, and the controller 200 reads, from the storage 210, a width associated with a size of an input sheet, and stores, in the storage 210, a maximum width among the width associated with the input sheet, as a maximum sheet width. For example, when the sheet size is A4, the width is 210 mm. Further, a position of a movable width alignment plate may be detected by a sensor provided in the sheet feeding tray 111 according to a size of a sheet accommodated in the sheet feeding tray 111, and a sheet size may be detected from the detected position of the width alignment plate.

In step S1002, the controller 200 determines whether the size (width) of the sheet accommodated in any of the sheet feeding trays 111 is changed. When it is determined that the size (width) of the sheet accommodated in any of the sheet feeding trays 111 is changed, the control proceeds to step S1003, and when it is determined that the size (width) of the sheet accommodated in none of the sheet feeding trays 111 is changed, the processing of step S1002 is repeated. For example, when a size of a sheet accommodated in any of the sheet feeding trays 111 is changed by user input from the operation panel 40, the controller 200 determines that the size (width) of the sheet accommodated in any of the sheet feeding trays 111 is changed. Further, a position of a movable width alignment plate may be detected by a sensor provided in the sheet feeding tray 111 according to a size of a sheet accommodated in the sheet feeding tray 111, and determination may be made as to whether a size of a sheet accommodated in any of the sheet feeding trays 111 is changed according to a determination result as to whether the position of the width alignment plate is moved.

In step S1003, the controller 200 determines whether the maximum sheet width of the sheet accommodated in the current sheet feeding tray 111 is less than the maximum sheet width stored in the storage 210. When it is determined that the maximum sheet width of the sheet accommodated in the current sheet feeding tray 111 is less than the maximum sheet width stored in the storage 210, the control proceeds to step S1004. When it is determined that the maximum sheet width of the sheet accommodated in the current sheet feeding tray 111 is not less than the maximum sheet width stored in the storage 210, the control proceeds to step S1021.

In step S1004, the controller 200 updates the maximum sheet width stored in the storage 210 to the maximum width of the sheet stored in the current sheet feeding tray 111, and stores the updated maximum sheet width in the storage 210.

In step S1005, the controller 200 determines whether the image forming apparatus 1 is in a user account environment. When it is determined that the image forming apparatus 1 is in the user account environment, the control proceeds to step S1006, and when it is determined that the image forming apparatus 1 is not in the user account environment, the control returns to step S1002. For example, when the controller 200 already performs authentication of a user using the image forming apparatus 1, and the user is in a login state in the image forming apparatus 1, it is determined that the image forming apparatus 1 is in the user account environment. When the controller 200 does not perform authentication of the user using the image forming apparatus 1, and none of the users is in a login state in the image forming apparatus 1, it is determined that the image forming apparatus 1 is not in the user account environment.

In step S1006, the controller 200 determines whether the login user can perform replacement work of the fixing device 60, based on the user account table 401. When it is determined that the login user can perform replacement work of the fixing device 60, the control proceeds to step S1007, and when it is determined that the login user cannot perform replacement work of the fixing device 60 (not permitted), the control proceeds to step S1010. For example, when a user, whose user ID is user 1, logs in, the controller 200 determines that the login user can perform replacement work of the fixing device 60, based on the user account table 401 in FIG. 4. For example, when a user, whose user ID is user 2, logs in, the controller 200 determines that the login user cannot perform replacement work of the fixing device 60, based on the user account table 401 in FIG. 4.

In step S1007, the controller 200 inquires the user whether to perform replacement of the fixing device 60. Specifically, for example, the controller 200 displays a message screen 1101 as illustrated in FIG. 11 on the operation panel 40. On the message screen 1101, "a current fixing belt size is . Do you want to replace the fixing unit?" is displayed as a message. Note that "" is a size of the intermediate transfer belt 146*a* loaded in the current image forming apparatus 1. Further, on the message screen 1101, a "Yes" button for shifting to a machine adjustment screen, and a "No" button indicating that replacement of the fixing device 60 is not performed are displayed.

In step S1008, the controller 200 determines whether the "Yes" button on the message screen 1101 is depressed by the user, and when it is determined that the "Yes" button is depressed, the control proceeds to step S1009, and when it is determined that the "Yes" button is not depressed (the "No" button is depressed), the control returns to step S1002.

In step S1009, the controller 200 displays a machine adjustment screen 1201 as illustrated in FIG. 12 on the operation panel 40. On the machine adjustment screen 1201, a "fixing unit replacement" button indicating start of replacement processing of the fixing device 60 is displayed. When the "fixing unit replacement" button is depressed by the user, the controller 200 starts replacement processing of the fixing device 60. Since replacement processing of the fixing device 60 has already been described, description thereof is omitted. Then, the control returns to step S1002.

In step S1010, the controller 200 displays a message screen 1301 as illustrated in FIG. 13 on the operation panel 40. On the message screen 1301, a message of prompting to contact a user capable of performing replacement work of the fixing device 60 is displayed. Specifically, as illustrated in FIG. 13, on the message screen 1301, "a current fixing belt size is . When replacing the fixing unit, contact a person capable of performing replacement work." is displayed as a message. Further, on the message screen 1301**, an "OK" button to be depressed when the above message is approved is displayed.

In step S1011, the controller 200 determines whether the "OK" button on the message screen 1301 is depressed by the user, and when it is determined that the "OK" button is depressed, the control returns to step S1002. The controller 200 repeats determination as to whether the "OK" button is depressed until the "OK" button is depressed.

In step S1021, the controller 200 determines whether the maximum sheet width of the sheet accommodated in the current sheet feeding tray 111 is larger than the maximum sheet width stored in the storage 210. When it is determined that the maximum sheet size of the sheet accommodated in the current sheet feeding tray 111 is larger than the maximum sheet width stored in the storage 210, the control proceeds to step S1022. When it is determined that the maximum sheet width of the sheet accommodated in the current sheet feeding tray 111 is not larger than the maximum sheet width stored in the storage 210, the control returns to step S1002.

In step S1022, the controller 200 updates the maximum sheet width stored in the storage 210 to the maximum width of the sheet accommodated in the current sheet feeding tray 111, and stores the updated maximum sheet width in the storage 210.

In step S1023, the controller 200 determines whether the image forming apparatus 1 is in the user account environment. When it is determined that the image forming apparatus 1 is in the user account environment, the control proceeds to step S1024, and when it is determined that the image forming apparatus 1 is not in the user account environment, the control returns to step S1002.

In step S1024, the controller 200 determines whether the login user can perform replacement work of the fixing device 60, based on the user account table 401. When it is determined that the login user can perform replacement work of the fixing device 60, the control proceeds to step S1025, and when it is determined that the login user cannot perform replacement work of the fixing device 60 (not permitted), the control proceeds to step S1027.

In step S1025, the controller 200 requests the user to replace the fixing device 60. Specifically, for example, the controller 200 displays a message screen 1401 as illustrated in FIG. 14 on the operation panel 40. On the message screen 1401, "a current fixing belt size is . Replace the fixing unit." is displayed as a message. Note that, "" is a size of the intermediate transfer belt 146*a* loaded in the current image forming apparatus 1. Further, on the message screen 1401, a "Yes" button for shifting to a machine adjustment screen, and a "No" button indicating that replacement of the fixing device 60 is not performed are displayed.

In step S1026, the controller 200 determines whether the "Yes" button on the message screen 1401 is depressed by the user, and when it is determined that the "Yes" button is depressed, the control proceeds to step S1009, and when it is determined that the "Yes" button is not depressed (the "No" button is depressed), the control returns to step S1002.

Figure 15:
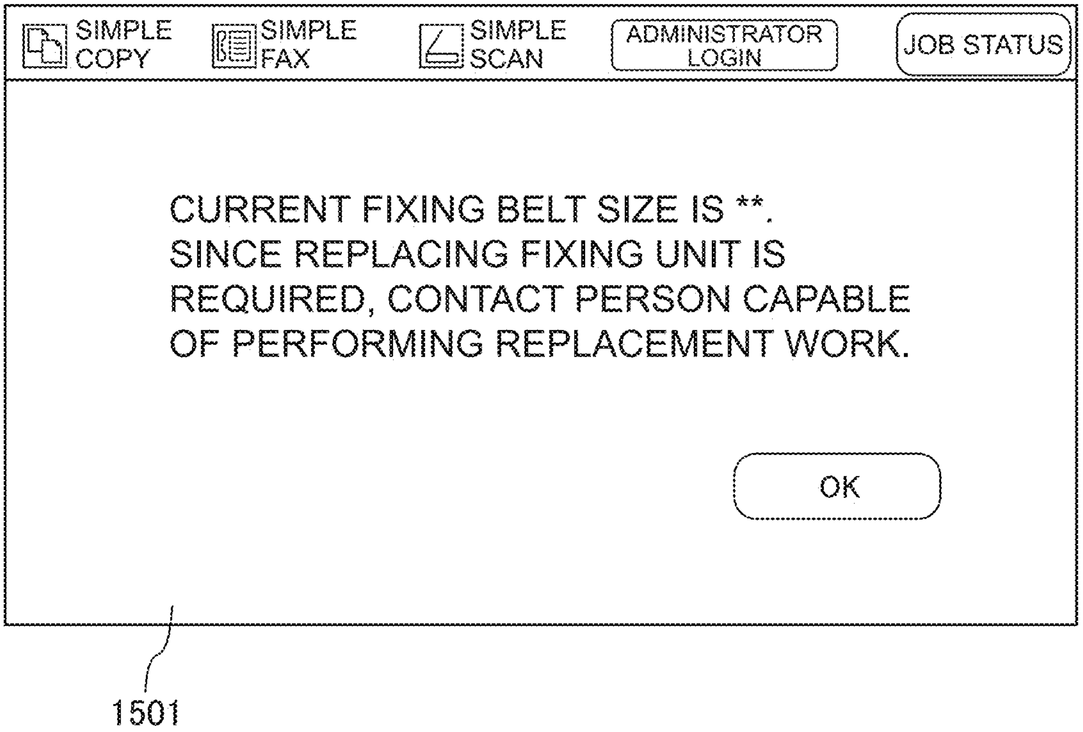
FIG. 15 is a diagram illustrating an example of a message screen.

In step S1027, the controller 200 displays a message screen 1501 as illustrated in FIG. 15 on the operation panel 40. On the message screen 1501, a message of prompting to contact a user capable of performing replacement work of the fixing device 60 is displayed. Specifically, as illustrated in FIG. 15, on the message screen 1501, "a current fixing belt size is . Since replacement of the fixing unit is required, contact a person capable of performing replacement work." is displayed as a message. Further, on the message screen 1501**, an "OK" button to be depressed when the above message is approved is displayed.

In step S1028, the controller 200 determines whether the "OK" button on the message screen 1501 is depressed by the user, and when it is determined that the "OK" button is depressed, the control returns to step S1002. The controller 200 repeats determination as to whether the "OK" button is depressed until the "OK" button is depressed.

In the image forming apparatus according to the embodiment, whether to perform replacement of the fixing device is inquired according to permission to perform replacement work of the fixing device by the user. Therefore, it is possible to prevent the user who cannot perform the replacement work of the fixing device from being confused. Further, in the image forming apparatus according to the embodiment, it is possible to inquire a user who can perform the replacement work of the fixing device whether to perform the replacement work of the fixing device. Further, in the image forming apparatus according to the embodiment, it is possible to display a message of prompting the user who cannot perform the replacement work of the fixing device to contact a user capable of performing the replacement work of the fixing device. Further, in the image forming apparatus according to the embodiment, when the size of a sheet within the sheet feeding tray is changed, it is possible to inquire the user who can perform the replacement work of the fixing device whether to perform the replacement of the fixing device.

Note that, the present disclosure is not limited to the above-described embodiment and can be modified, and the above-described configuration can be replaced by a substantially identical configuration, a configuration that provides the same advantageous effect, or a configuration that can achieve the same purpose.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An image forming apparatus comprising:

an apparatus main body to which a fixing device that thermally fixes a toner image on a sheet is detachably mounted;

a controller that controls the image forming apparatus and performs authentication of a user using the image forming apparatus;

a storage that stores user information indicating a permission to perform replacement work of the fixing device by the user; and a sheet feeding tray that accommodates the sheet, wherein the controller:

determines whether a width of the sheet accommodated in the sheet feeding tray is changed, and determines whether the replacement work of the fixing device by the user is permitted when the width of the sheet accommodated in the sheet feeding tray is determined as changed, and inquires the user whether to perform replacement of the fixing device based on a first determination result, and determines the permission to perform the replacement work of the fixing device by the user based on the user information at a time of usage by the authenticated user, and inquires the user whether to perform the replacement of the fixing device based on a second determination result.

2. The image forming apparatus according to claim 1, wherein the controller displays a different message between a case, in which the replacement work of the fixing device by the user is determined as permitted, and a case, in which the replacement work of the fixing device by the user is determined as not permitted.

3. The image forming apparatus according to claim 2, wherein the controller further:

displays a message of inquiring the user whether to perform the replacement of the fixing device when the replacement work of the fixing device by the user is determined as permitted , and displays a message of prompting to contact a user capable of performing the replacement work of the fixing device when the replacement work of the fixing device by the user is determined as not permitted.

* * * * *